(No Model.)
T. W. KNIGHT.
COTTON SWEEP.
No. 382,533.　　　　　Patented May 8, 1888.
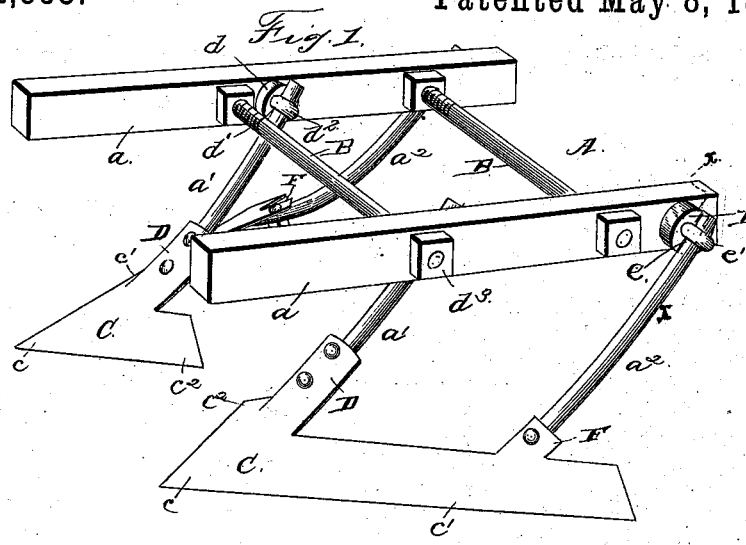
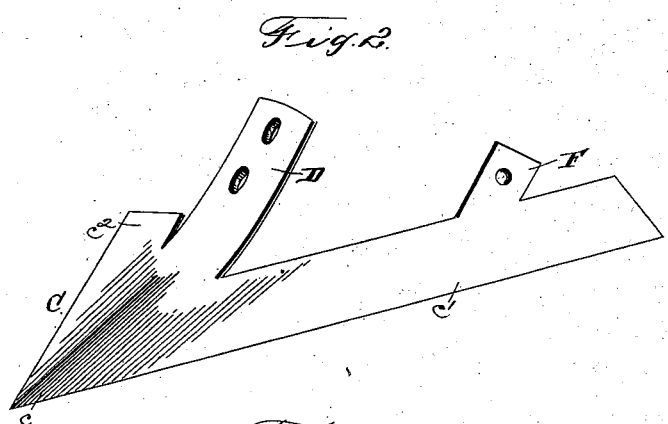
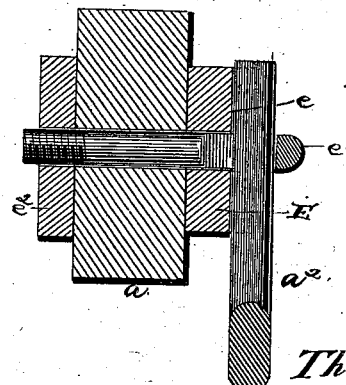
Witnesses.
Geo. Tripe
Rich? J Marshall Jr
Inventor,
Thaddeus W. Knight.
By his Attorneys.
C. A. Snow & Co.

UNITED STATES PATENT OFFICE.

THADDEUS WARSAW KNIGHT, OF KYLE, TEXAS.

COTTON-SWEEP.

SPECIFICATION forming part of Letters Patent No. 382,533, dated May 8, 1888.

Application filed February 9, 1888. Serial No. 263,491. (No model.)

*To all whom it may concern:*

Be it known that I, THADDEUS WARSAW KNIGHT, a citizen of the United States, residing at Kyle, in the county of Hays and State of Texas, have invented new and useful Improvements in Cotton-Sweeps, of which the following is a specification.

The invention relates to improvements in cotton-sweeps; and it consists of the construction and novel combination of parts hereinafter described, illustrated in the drawings, and pointed out in the appended claims.

In the drawings, Figure 1 is a perspective view of a part of a cultivator embracing the invention. Fig. 2 is a perspective view of one of the blades detached. Fig. 3 is a detail sectional view through one of the longitudinal beams and one of the blocks $d$ on the line $x\ x$, Fig. 1.

A represents the frame of a plow or cultivator, having the longitudinal beams $a\ a$, to which the blades of the device are attached by means of the standards or detachable shanks $a'\ a^2$. The beams $a\ a$ are held together by the transverse bars B B, tapped at their ends and engaged to nuts both inside and outside said beams.

C C are the plows or blades, each having the front point or angle, $c$, the long arm $c'$, running rearward and outward therefrom, and the short arm $c^2$, running rearward and inward from the point.

D is an extension made integral with the blade or plow, and curving rearward and upward from the angle of its point. The lower end of the detachable shank $a'$ on one side is bolted to said extension D, its upper end fitting into the diametrical groove $d'$ on the screw-block $d$ and being held therein by the eyebolt $d^2$, the end of the eye of which is inserted or driven into said block. The eyebolt passes through the adjacent beam $a$ of the frame and engages a nut, $d^3$, on the outer side thereof.

E is a block similar to but in rear of the block $d$ on the outside of the beam A. The upper end of the detachable shank $a^2$ on one side lies in the diametrical groove $e$ of the said block, and is held therein by the eyebolt $e'$ engaging a nut, $e^2$. The lower end of said shank is bolted to an inwardly and upwardly standing projection, F, from the inner edge of the long outer arm, $c'$, of the adjacent point or blade, which arm is preferably made integral with the said blade.

The two points, when secured, as described, to the frame, have their arms inclining downward from their longitudinal axis and their outer edges sharp, so that they will keep below the ground, and will cut away all the weeds and rank growth between the rows of corn or cotton stalks, the rows of stalks passing between the two points. The points may be attached to the standards of any plow or cultivator, and will clear and cut up roots from a space of about eighteen inches on each side of the rows. The long and short arms of each blade make an angle of about forty-five degrees at the apex, and the blades are made right and left and are intended to run below the ground.

The detachable shanks $a'\ a^2$ are vertically adjustable in the grooved blocks and eyebolts to a sufficient extent to permit the angle $c$ of the arms $c'\ c^2$ to be raised or lowered.

The blades clear away the undergrowth and weeds very rapidly, so that it will clear and clean two rows at one time and by passing over the ground once.

The beams $a\ a$ are adjustable toward each other by means of the bars B and nuts on their ends.

Having thus described my invention, I claim—

1. The combination, with the frame A, having the longitudinal beams $a\ a$, and with the detachable shanks $a'\ a^2$, of the blades or points C, each composed of the outer long arm, $c'$, and the inner short arm, $c^2$, making the front angle, $c$, of about forty-five degrees with each other, and having their lower front edges sharpened, as and for the purpose specified.

2. In a cotton or corn sweep, the blades or points C, composed of the outer long arm, $c'$, and the inner short arm, $c^2$, the said arms meeting at the front point or angle, $c$, with the long arm running rearward and outward therefrom, and the short arm running rearward and inward from said point or angle, as set forth.

3. In a cotton or corn sweep, the blades or points C, each composed of the outer or long arm, $c'$, and the inner or short arm, $c^2$, said arms meeting each other at the point or angle C, the extension D, extending upward from the angle or point, the extension F on the long arm, the frame, and the standards $a'$ $a^2$, connected to the frame and arranged on opposite sides thereof, said standards being connected, respectively, to the extensions D F of the blades, as set forth.

In testimony that I claim the foregoing as my own I have hereto affixed my signature in presence of two witnesses.

THADDEUS WARSAW KNIGHT.

Witnesses:
J. N. TAYLOR,
A. C. BLAIR.